United States Patent
Morse et al.

(10) Patent No.: US 6,602,327 B2
(45) Date of Patent: Aug. 5, 2003

(54) PROCESS FOR REMOVING AN UNDESIRABLE DISSOLVED GAS FROM A LIQUID

(75) Inventors: Dwain E. Morse, 2655 Montrose Pl., Santa Barbara, CA (US) 93105; Wade O. Morse, Santa Barbara, CA (US); Thomas G. Matherly, Lompoc, CA (US)

(73) Assignee: Dwain E. Morse, Santa Barbara, CA (US)

( * ) Notice: Subject to any disclaimer, the term of this patent is extended or adjusted under 35 U.S.C. 154(b) by 0 days.

(21) Appl. No.: 10/271,018

(22) Filed: Oct. 14, 2002

(65) Prior Publication Data

US 2003/0121416 A1 Jul. 3, 2003

Related U.S. Application Data

(63) Continuation of application No. 10/180,216, filed on Jun. 25, 2002.
(60) Provisional application No. 60/300,768, filed on Jun. 25, 2001.

(51) Int. Cl.$^7$ .............................................. B01D 19/00
(52) U.S. Cl. .............................. 95/261; 95/263; 95/266; 96/195; 96/202; 96/209; 210/188
(58) Field of Search ......................... 95/261, 263, 266; 96/195, 202, 208, 209, 216; 210/188

(56) References Cited

U.S. PATENT DOCUMENTS

| | | | | |
|---|---|---|---|---|
| 3,007,542 A | * | 11/1961 | Giampapa et al. |
| 4,279,743 A | * | 7/1981 | Miller |
| 4,585,465 A | * | 4/1986 | Suzuki et al. |
| 4,838,434 A | * | 6/1989 | Miller |
| 4,997,549 A | * | 3/1991 | Atwood |
| 6,004,386 A | * | 12/1999 | Grisham et al. |
| 6,105,942 A | * | 8/2000 | Kurzer et al. |

* cited by examiner

Primary Examiner—Duane S. Smith
(74) Attorney, Agent, or Firm—Kelly Bauersfeld Lowry & Kelley, LLP

(57) ABSTRACT

Undesirable dissolved gas is removed from a liquid by pressurizing the liquid containing the undesirable dissolved gas therein. The liquid is then directed into a hydrocyclone having an inlet optimized for liquid particle movement through a liquid vortex stream created by the hydrocyclone. A preferred gas is injected into an evacuated central area of the liquid vortex stream for absorption therein. The pressure of the liquid is then lowered, such as by directing the liquid to a discharge tank, in order to remove a proportional amount of absorbed preferred gas and the undesirable dissolved gas from the liquid.

26 Claims, 8 Drawing Sheets

PROCESS FOR REMOVING AN UNDESIRABLE DISSOLVED GAS FROM A LIQUID

RELATED APPLICATION

This application is a continuation of application Ser. No. 10/180,216 filed Jun. 25, 2002 which claims priority to U.S. Provisional Application Ser. No. 60/300,768, filed Jun. 25, 2001.

BACKGROUND OF THE INVENTION

The present invention generally relates to the removal of dissolved gases from liquids. More particularly, the present invention relates to a process for removing an undesirable dissolved gas from a liquid by absorbing a preferred gas into a pressurized liquid, and subsequently lowering the pressure of the liquid to remove at least a portion of the undesirable and preferred dissolved gases.

Unwanted or undesirable gases are often found in liquids. For example, hydrogen sulfide gas is often found in industrial waste water streams, which is caustic and an environmental pollutant. In other instances, naturally occurring dissolved gases, such as oxygen, are found in processing liquids. For example, in circuit board processing liquids, the presence of oxygen can be detrimental to the overall process. Thus, an inert gas, such as argon, would preferably be present in the processing liquid as such inert gas would not adversely effect the circuit board processing.

Conventional practice for removing undesirable dissolved gases from a liquid has included the steps of placing the liquid within a tank so as to pressurize it. Desirable or preferred gas is entrained within the liquid to a certain extent due to the pressurization. The liquid is often stirred in an attempt to entrain additional desirable or preferred gas. However, such methods are only capable of entraining approximately five to seventeen parts per million of the desired dissolved gas into the target liquid. The liquid is then subject to a low pressure, such as a vacuum chamber, in order to remove at least a portion of the preferred gas and the undesirable gas. These gases are then passed through a scrubbing device, like a carbon filter, or the like.

The hydrocyclone has been used as a separator of particles with different specific gravities for years. In an effort to reduce bubble residence time, a variation of the general hydrocyclone, the air-sparged hydrocyclone described in U.S. Pat. No. 4,279,743 utilizes a combination of centrifugal force and air sparging to remove particles from a fluid stream. The stream is fed under pressure into a cylindrical chamber having an inlet configured to direct the fluid stream into a generally spiral path along a porous wall. The angular momentum of the fluid generates a radially directed centrifugal force related to the fluid velocity and the radius of the circular path. The porous wall is contained within a gas plenum having gas pressurized to permeate the porous wall and overcome the opposing centrifugal force acting on the fluid.

In operation, the unit receives and discharges the rapidly circulating solution while the air permeates through the porous wall. Air bubbles that emit from the wall are sheared into the fluid stream by the rapidly moving fluid flow. The invention claims that micro-bubbles formed from the shearing action combine with the particles or gases in the solution and float them toward the center of the cylinder as froth in a vortex. The centrally located froth vortex is then captured and exited through a vortex finder disposed at the upper end of the cylinder while the remaining solution exits the bottom of the cylinder.

One variation in the general ASH construction, as described in U.S. Pat. Nos. 4,838,434 and 4,997,549, includes employing a froth pedestal at the bottom of the cylinder to assist directing the froth vortex through the vortex finder. Another ASH modification includes replacing the vortex finder and froth pedestal with a fixed splitter disposed at the bottom of the cylinder and having a cylindrical knife-edge. The edge is positioned to split the helically flowing solution into components dependent upon the specific gravity of the components.

However, it has been found that traditional hydrocyclones, including air-sparged hydrocyclones, essentially stratify the various components of the contaminated fluid according to specific gravity. Accordingly, it is an object of the present invention to provide a modified hydrocyclone which becomes a mixer in order to inject desirable gas into the fluid, and subsequently eliminate fractionated or proportional amounts of desirable and undesirable or otherwise unwanted gases. It has been found that the present invention is capable of removing undesirable dissolved gases from a liquid in a more simple manner and to a greater degree than prior systems.

Accordingly, there is a continuing need for a method for removing undesirable dissolved gas from a liquid in a more simple manner and to a greater degree. The present invention fulfills these needs and provides other related advantages.

SUMMARY OF THE INVENTION

The present invention resides in a process for removing an undesirable dissolved gas from a liquid by injecting or otherwise entraining and absorbing a preferred gas into the liquid, and subsequently removing at least a portion of the dissolved undesirable and preferred gases from the liquid. This is done by overentraining the preferred gas in a elevated ratio to the undesirable or bad gas, for example 1-to-100. A percentage of the total undesirable gas is then removed through the delivered adjustment of the ratio of undesirable to desirable gas. This is done by degassing the liquid after treatment, so that the amount of the undesirable gas is significantly reduced, in the provided example 1/100th of the undesirable gas is present in the liquid after treatment.

The process comprises the steps of first pressurizing the liquid containing the undesirable dissolved gas. A hydrocyclone is selected having an inlet aperture size and configuration corresponding with the liquid pressure to optimize the liquid particle movement through a liquid vortex stream created by the hydrocyclone. A barrel diameter and length of the hydrocyclone is also optimized for liquid particle movement. The liquid containing the undesirable dissolved gas is then directed into the hydrocyclone to form a liquid vortex stream having an evacuated central area. A preferred gas is injected into the evacuated central area for absorption into the liquid vortex stream.

The liquid is then directed from the hydrocyclone into a diffusion column, and then into a pressure chamber having an upper gas region and a lower liquid region to collect large bubbles and non-dissolved preferred gas from the liquid. The preferred gas in the gas region of the pressure chamber is then directed back into the evacuated area of the liquid vortex so as to be recycled. Pressurized preferred gas is added into the pressure chamber when the gas level of the pressure chamber falls below a predetermined level.

The liquid which exits the pressure chamber and contains the absorbed preferred gas and undesirable dissolved gas at the new pressurized ratio has its pressure lowered to cause a proportional release of the absorbed preferred gas and the undesirable dissolved gas from the liquid. This may be done by passing the liquid through a cavitation plate and then directing the liquid into a discharge or de-gas tank. Preferably, the liquid is directed through an outlet pipe of increasing diameter and having an outlet thereof directed towards a liquid surface of the discharge tank. Alternatively, the liquid is directed through a vacuum cyclone device disposed within the discharge tank and having an outlet thereof directed towards a liquid surface of the discharge tank, or towards a flow reflector within the discharge tank.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

The present invention resides in a process and system capable of delivering a massive concentration of a desirable or preferred gas into a liquid in order to remove an unwanted or undesirable gas which is already dissolved in the liquid. The physical parameters of the system can be configured and altered in order to optimize the levels of preferred gases dissolved within the liquid, in order to remove greater proportions of unwanted gases. Some examples of the desirability of driving out non-preferential gases include oxygen entrainment in industrial waste water streams as an instrument to drive out unwanted hydrogen sulfide gas. Another is the entrainment of an inert gas, such as argon, in circuit board processing liquids as an instrument to drive out unwanted oxygen.

Figure 1:
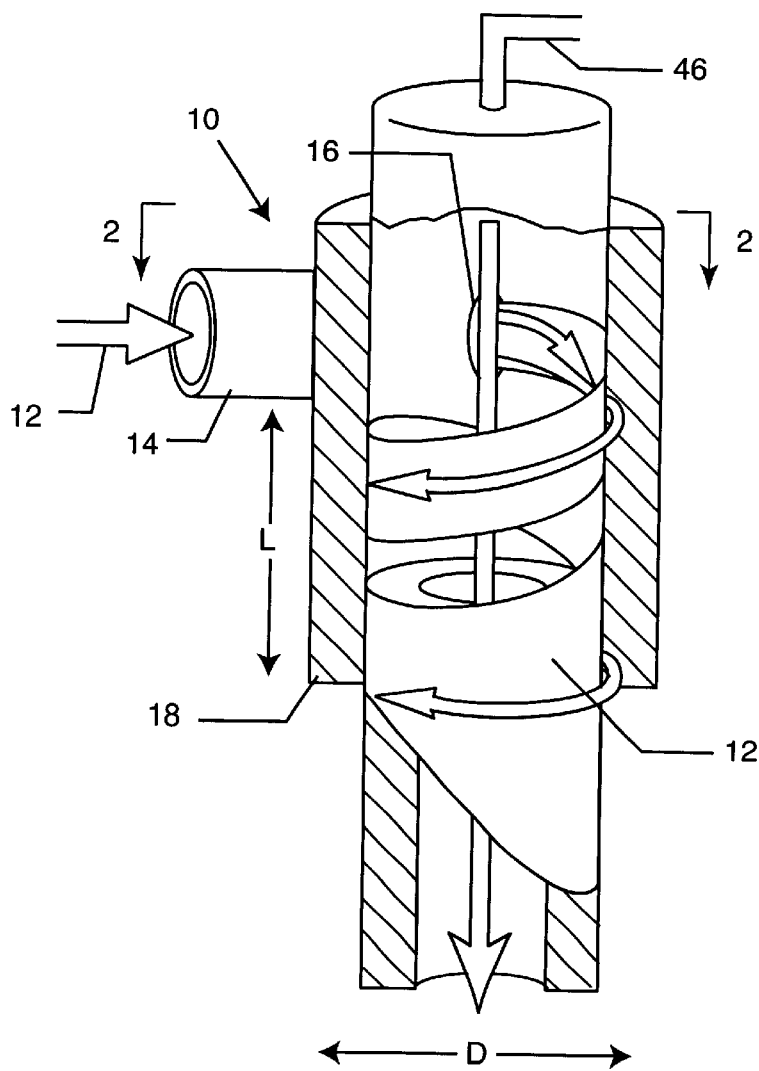
FIG. 1 is a partially sectioned view of a hydrocyclone device forming a liquid vortex system in accordance with the present invention.
Figure 2:
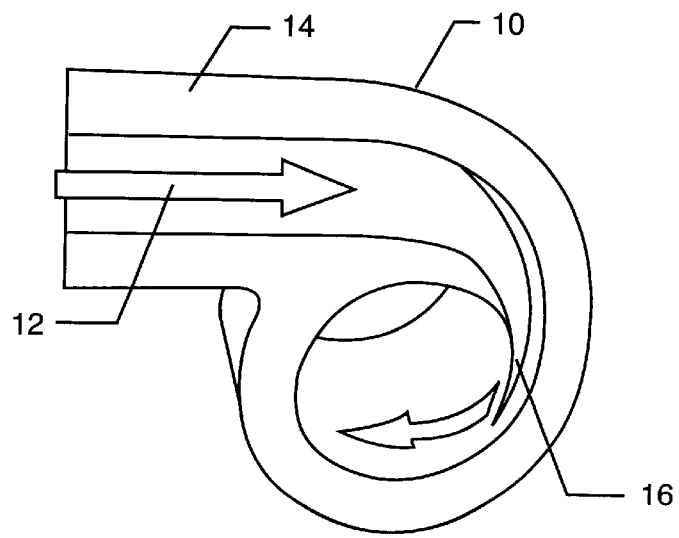
FIG. 2 is a cross-sectional view taken generally along line 2—2 of FIG. 1, illustrating liquid flow through an aperture thereof.

Referring now to FIG. 1, a section of a hydrocyclone 10 is illustrated having a stream of liquid 12 containing unwanted, dissolved gas passing therethrough. The hydrocyclone 10 includes a receiving pipe 14 which directs the liquid 12 through an inlet 16 such that the liquid directs the liquid stream 12 into a generally spiral path along an inner surface of a barrel 18 of the hydrocyclone 10. As mentioned above, hydrocyclones, and particularly air-sparged hydrocyclones, have been used in the past in the processes of separating contaminants from a liquid by flocculation and flotation systems. However, as will be more fully described herein, such systems have not optimally introduced an intended gas into the liquid 12 to be treated. The inventors have discovered that altering the pressure of the incoming liquid 12, the aspect ratio of the inlet 16, and the diameter D and length L of the barrel 18 can significantly increase the amount of preferred gas which is dissolved into the liquid 12.

Figure 3:
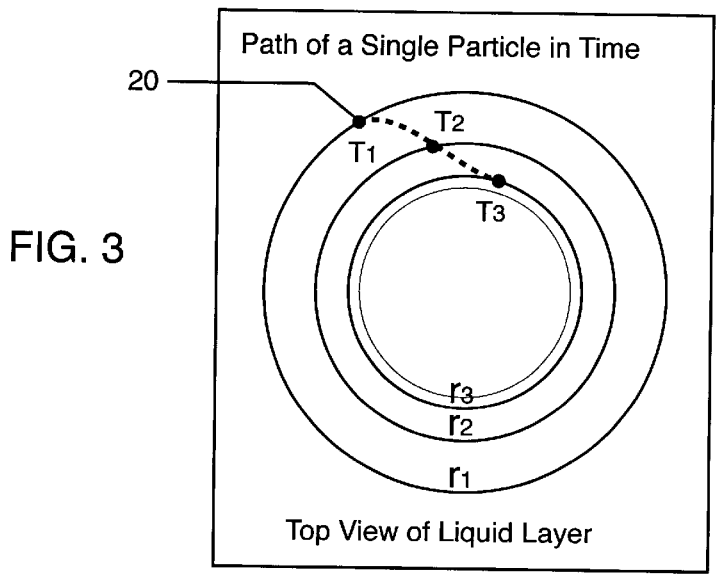
FIG. 3 is a diagrammatic view of a path of a particle of the liquid within the hydrocyclone over time.
Figure 4:
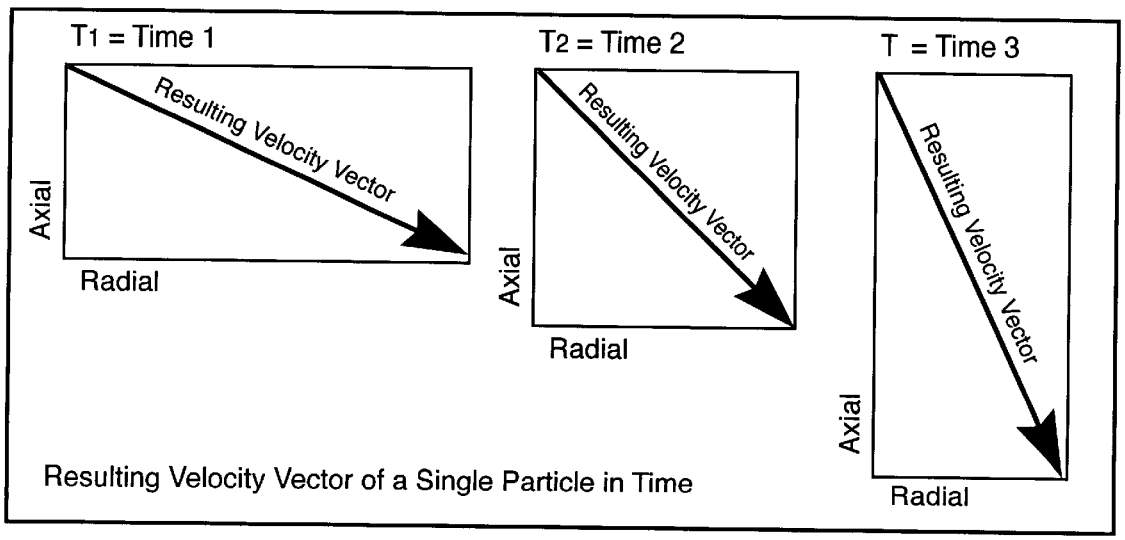
FIG. 4 are diagrammatic representations of resulting velocity vectors of the single particle over the same time period.

With reference now to FIGS. 3 and 4, FIG. 3 illustrates a path of a particle 20 over time in the liquid stream vortex of the hydrocyclone 10 of the present invention. It is a primary objective of the present invention to cause the particles in the liquid stream 12 to migrate and move throughout the stream 12 as it travels through the hydrocyclone 10 so that each particle, or as many particles as possible, are presented at the liquid/gas boundary (R3) to optimize adsorption. This is performed by controlling the pressure of the system.

A particle in accordance with the definitions of the present application is an individual mechanical component of a liquid solution. Particles possess dimension and mobility. Under the effective directional force, a particle will typically travel as one entity. Force may cause the subdivision of a particle into two or more smaller particles. A larger particle may grow from a combination of smaller particles. A particle may be a molecule of a substance, or a group of molecules of a substance or substances. The substance or substances may comprise a solid, liquid, or gas, or a combination thereof. A particle may be spherical, or may be complex or asymmetrical in form. A particle is an instantaneous entity, that is, the particle character may change in time as a result of external influences. Thus, segments of the water or liquid itself may form aggregate groups defining a particle in accordance with the present invention, and not necessarily only those contaminants within the liquid 12.

With continuing reference to FIGS. 3 and 4, directional forces act upon a particle 20 in the liquid 12 and are of two origins. The first force is a centrifugal force resulting from angular momentum of liquid constituent of particles contained cylindrically and thus forced into rotational flow by virtue of the entering liquids tangential velocity. This provides a radial force Vr to individual liquid particles. The second force is an axial force Va caused by the displacement of liquid particles away from the tangential inlet 16, along the axial dimension, or length, of the liquid conduit barrel 18 formed by the hydrocyclone 10.

In FIGS. 3 and 4, a single liquid particle 20 is shown in sequential positions within the hydrocyclone 10, each position being separated from the next by the passage of time, and thus placed in a different radial position within the spiraling liquid stream 12. FIG. 4 charts the resulting velocity vector, denoted by an arrow, of the single particle 20 over the three time periods. When the particle 20 is adjacent to the solid inner-surface of the hydrocyclone 10 (R1), its resulting velocity vector is mainly radial. However, as the particle 20 moves towards the central evacuated portion (R3), the resulting velocity vector is predominantly axial, or extending downwardly into the barrel 18. The single particle 20 is defined in the illustrations in three discrete locations at three sequential times, however, it is to be understood that time is a continuum, and thus radial and axial velocity of the particle are in a continuous flux.

By optimizing the physical parameters of the system of the present invention, the liquid particles, although having a constant mass, can have a constantly changing angular momentum and thus be in continual directional flux. The liquid particle environment in the hydrocyclone 10 of the present invention comprises countless "liquid particles" of varying mass, size, shape and inter-particle attractive and repulsive forces, which further enhance desirable "nonballistic" translation of liquid particles. Collisions between particles, shear forces between particles induced to rotate due to asymmetrical centers of mass, and elastic behavior of dissolved or entrained gas particles are a few examples of the complexity of possible mixing modes in accordance with the present invention. The described motion of particle flux inside the liquid 12 layer in the hydrocyclone 10 extends to a boundary layer at the liquid solid interface (R1), and the liquid gas interface (R3), such that additive particles, such as gas, may be effectively introduced into the liquid 12 interface and mixed under pressure with desirable results. Thus, gas may be desirably entrained into the gas/liquid particle interface at higher levels, using lower operating pressures, and requiring less contact time, than is possible with prior art devices.

The ability to quickly and efficiently entrain various gases and liquids is the cornerstone of the present invention. Whether the entrainment is achieved in order to react with hydrogen sulfide gas in a septic body of water, or to displace free oxygen from water by over-pressurizing with a noble gas like argon, the basic mechanism that is controlled in all of the processes is the ability to position a gas into a body of liquid in the exact amount that is required for the next process to be effective.

Figure 5:
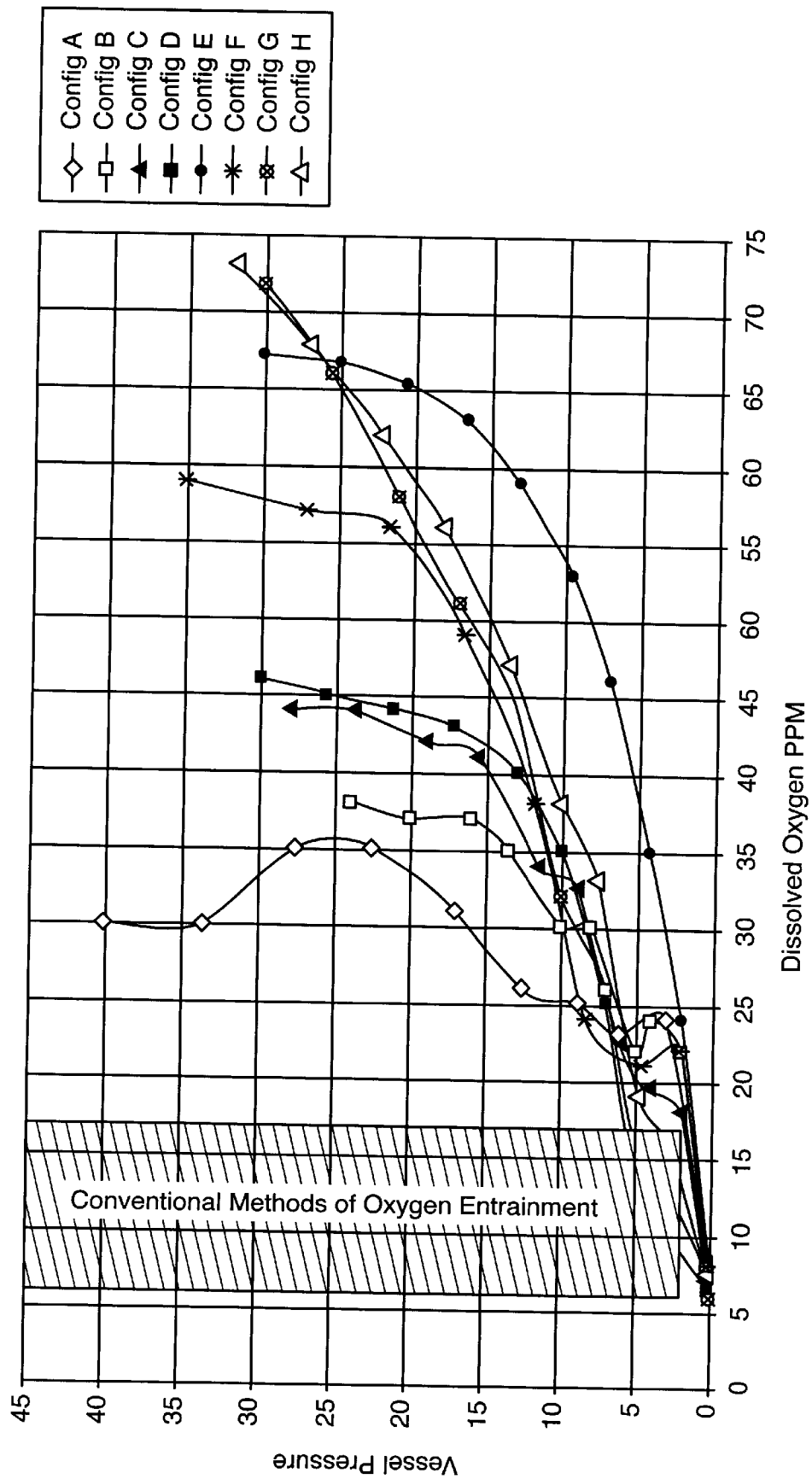
FIG. 5 is a chart illustrating levels of oxygen dissolved in a liquid using various hydrocyclone inlet configurations in accordance with the present invention as compared to conventional methods.

The chart of FIG. 5 documents this ability. Using a dissolved oxygen probe to measure the amount of oxygen that is entrained into standard tap water after passing through the hydrocyclone 10, the effectiveness of the process has been documented. Measurements were made after returning the liquid 12 to normal atmospheric pressure at sea level. All data is predicated on a one time exposure to forces inside the hydrocyclone 10. After one treatment the water was deposited down the drain. The probe used had an upper detection limit of 67 PPM dissolved oxygen. Although there is no indication that the effect would terminate abruptly at 67 PPM, to be conservative in the claims of entrainment, higher entrainment levels were approximated on the trend line only up to the very next achievable pressure setting on the pump for the liquid 12.

The chart illustrates the various levels of entrainment that were obtained using eight different hydrocyclone reactor heads, having different hydrocyclone inlet 16 aspect ratios. When the pressure of the water of the hydrocyclone 10 was increased through the use of a varidrive on a centrifugal pump, the entrainment levels of the dissolved oxygen in the water were measured as was indicated in FIG. 5.

With reference now to FIG. 5, a graph is shown depicting the typical dissolved oxygen parts per million (PPM) of prior art devices between a range of 6 and 17 parts per million, regardless of the hydrocyclone 10 pressure. Configurations A–H of the hydrocyclone inlet 16, also referred to herein as the inlet aspect ratio, are charted showing the dissolved oxygen PPM per vessel pressure. Configuration A was a 24-to-1 rectangular inlet aperture 16. Configuration B was a 10-to-1 rectangular configuration, configuration C being a 6-to-1 rectangular configuration, and configuration D being a 2.6-to-1 rectangular configuration. It will be seen that these configurations, while providing increased dissolved oxygen parts per million in comparison to the prior art, are not optimal configurations for the dissolution of oxygen into the water liquid. Configuration E was nearly square at an aspect ratio of 1-to-1.1, and provided a relatively high dissolved oxygen level at fairly low pressures. Configuration F, which was a circular hydrocyclone inlet 16 also provided satisfactory results, but at a higher liquid pressure. Configuration G, 4 small circular apertures, and configuration H, 32 very small holes or "a shower head" configuration also performed generally adequately, but required elevated liquid pressures. Thus, it can be seen that the alteration and selection of the hydrocyclone inlet 16 size and configuration, referred to herein as aspect ratio, can dramatically effect the amount of dissolved oxygen entrained or otherwise introduced into the liquid 12.

Thus, while many inlet aperture 16 profiles are available for use, some being octagonal, some being square, some being rectangular, it has been found that a square 1:1 profile or aspect ratio provides the greatest dissolving of gas given the pressure within the hydrocyclone 10. It has been found that in the 1-to-5 gallon per minute flow range, the width of the aperture should optimally be 0.3125 inches in square or smaller. In the 10-to-40 gallon per minute flow range of the liquid 12, the width and length of the aperture 16 should be approximately 0.6125 inches square or smaller. This inlet aperture 16 allows for an adequate pressure drop across the aperture hole 16, while leaving enough energy to keep the gas entrainment process at a high pressure.

As the aperture size of the inlet 16 is smaller than the pipe 14 that feeds the hydrocyclone 10, the speed at which the liquid travels through the aperture 16 increases. Once this conversion of pressure energy into velocity energy occurs, there is an accompanying drop in liquid pressure after the liquid has traveled through the aperture 16. Typically, 10-to-30 psi is normally converted from the pumping pressure into velocity. Converting less than 10 psi of pressure into velocity usually results in the formation of less than ideal quantities of entrained gas, while converting more than 30 psi of pressure into velocity usually results in the imparting of more gas than is required, thus wasting the preferred gas.

The diameter "D" of the barrel 18 of the hydrocyclone 10 also plays an important role in maintaining a proper environment. At a given flow/velocity from the aperture 16, a larger diameter down tube or barrel 18 results in less angular velocity. Smaller diameter barrels 18 result in increased angular velocity. These radial velocities cause greater or lesser mixing energy and must be considered when making a determination of the barrel 18 diameter. Another crucial component involved in the determination of down tube diameter is the thickness of the water ribbon that is formed in the barrel 18. Thicker ribbons of liquid result as the diameter of the barrel 18 decreases. Thus, it is more difficult to get each particle 20 to the center gas column for exposure to the gases when a thicker water ribbon is used. Preferably, a smaller diameter barrel 18 is used to increase angular velocity. For example, a 5-to-10 gallon per minute stream would use a barrel 18 having a diameter between 1 and 2 inches.

The length "L" of the barrel 18 is another physical parameter that can be altered in order to optimize the gas entrainment into the liquid 12. The longer the water is in the hydrocyclone 10 environment, the higher the probability that every single particle in the liquid 12 has been positioned at the gas/liquid boundary layer and given the opportunity to adsorb as much gas as possible. A general starting point for determining the length of the barrel 18 is approximately 15 times the barrel diameter D, but preferably less than 30 times the barrel diameter D. Frictional drag eventually overcomes the radial forces that spin the liquid 12 around the inner surface of the barrel 18, and convert the flow of the liquid 12 from a radial to a predominantly axial direction. At this point, the continuation of the barrel 18 serves no purpose. However, it has been found that the maximum gas entrainment is reached long before the frictional forces typically convert radial spin entirely into axial flow.

Figure 6:
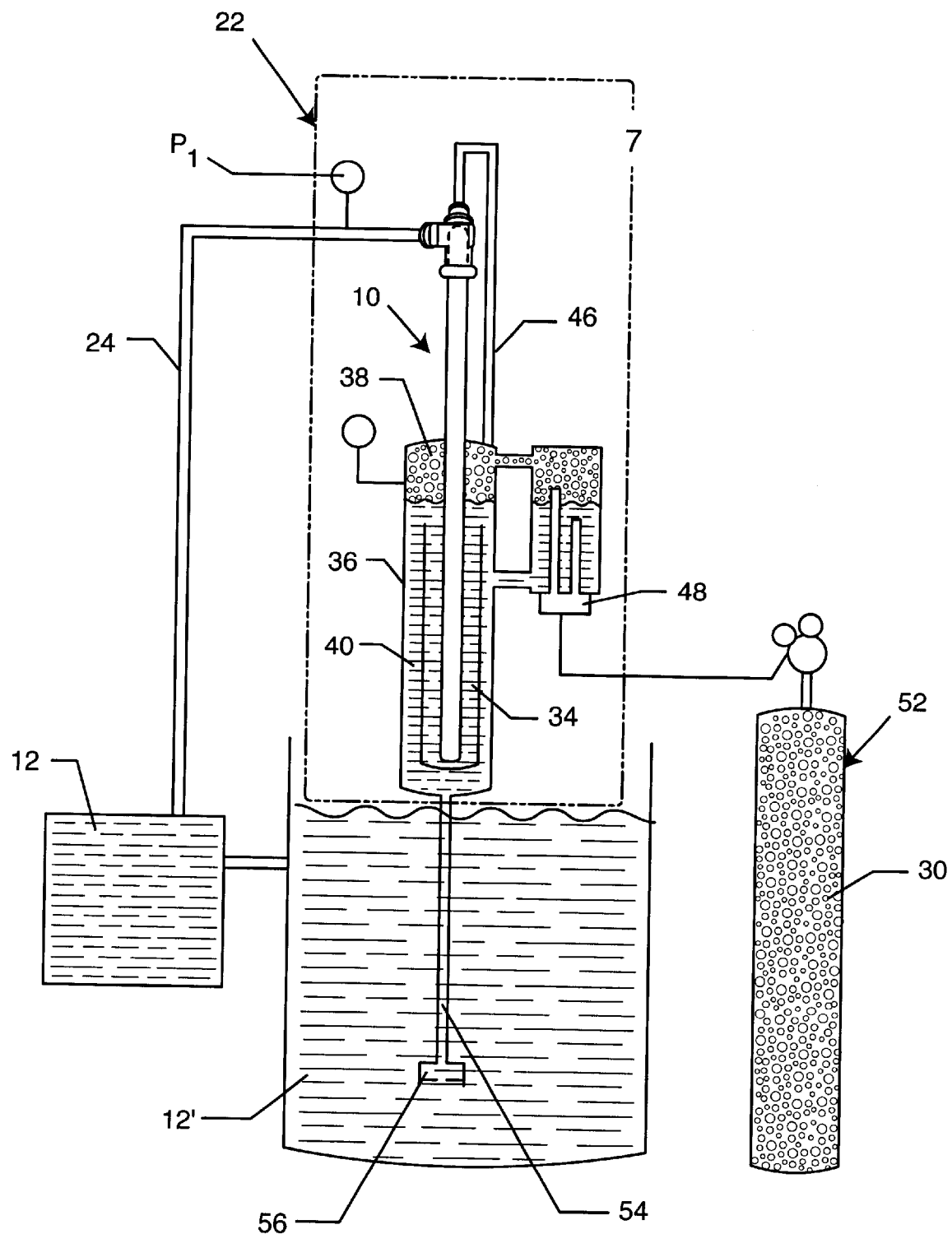
FIG. 6 is a diagrammatic view of a system for dissolving gas into a liquid.

With reference now to FIG. 6, a hydrocyclone 10 having an inlet 16 and barrel 18 optimized to entrain and dissolve gas into the liquid 12 is incorporated into a system 22 of the present invention. The liquid 12 to be treated is pumped through a pipe 24 so as to be at a first pressure P1, and into the hydrocyclone 10. The use of liquid transfer pumps 60 pressurizes the liquid 12 and transports it into the system 22. Once the liquid 12 is pressurized, the preferential gas 30 is entrained into the liquid 12 in a quantity that is much greater than that liquid 12 is able to contain at ambient pressure.

Figure 7:
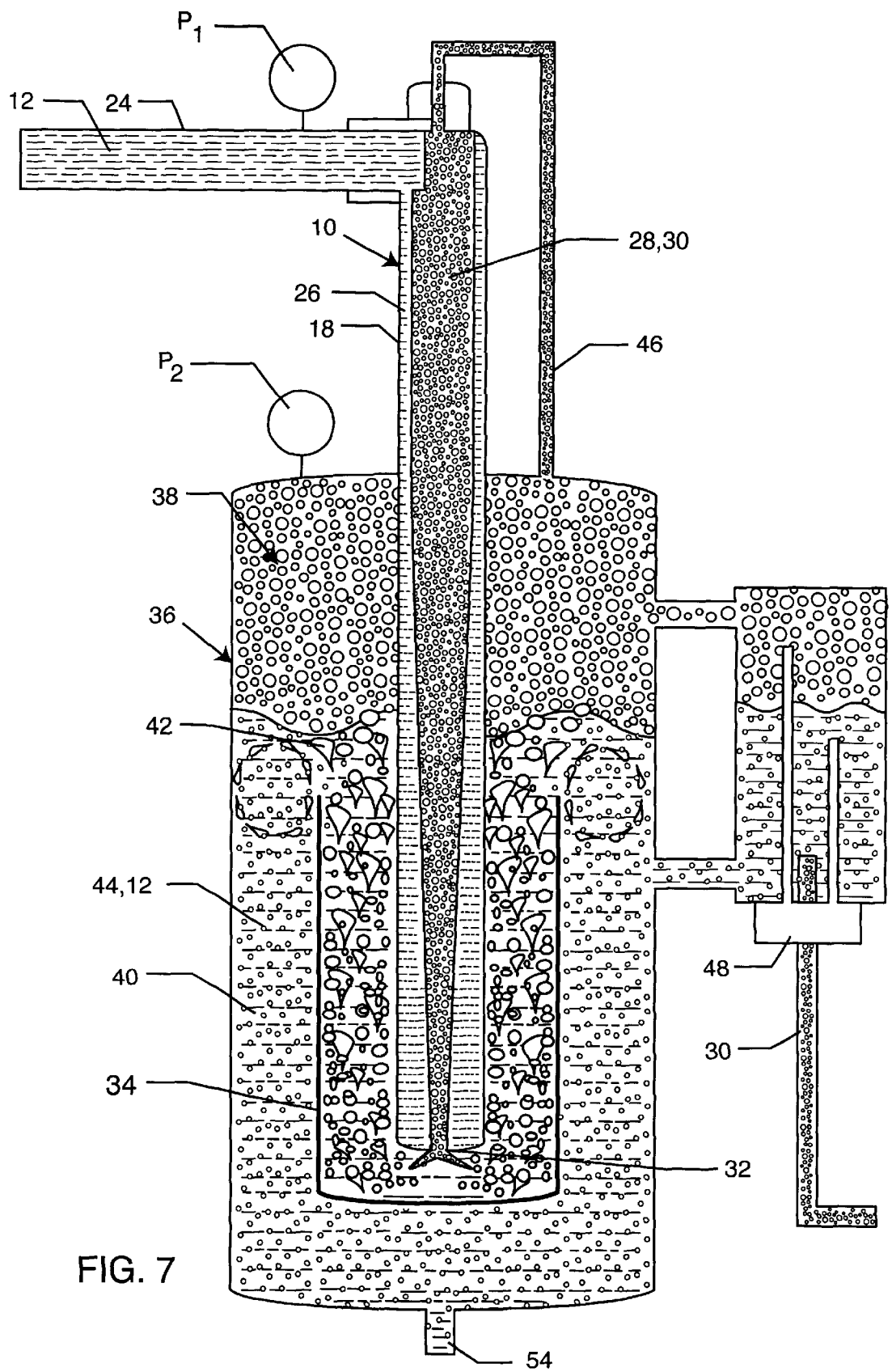
FIG. 7 is an enlarged sectional view of area "7" of FIG. 6, illustrating liquid passing through a hydrocyclone, a diffusion column and a pressure chamber of the present invention.

As shown in FIG. 7, after entering the hydrocyclone 10, the liquid 12 forms a vortex stream 26 having an evacuated central area or portion 28, which form a generally V sectional area, as illustrated. The gas 30 which is intended to be dissolved or otherwise entrained into the liquid is pumped into the hydrocyclone so that the gas 30 fills the evacuated portion 28. As described above, as the liquid 12 spirals through the barrel 18 of the hydrocyclone 10, its individual particles are continuously moved so that they contact the gas 30 interface. This enables the particles to adsorb as much gas as possible. This is due to the selection of the physical parameters of the hydrocyclone 10 for the given liquid pressure P1 and gas pressure P2.

The liquid 12 and gas 30 exit the hydrocyclone 10 at its outlet 32. A wall 34 is positioned below the outlet 32 of the hydrocyclone 10 and is directed upward so as to create a diffusion chamber. The diffusion chamber 34 converts the radial spin of energized liquid from the hydrocyclone 10 into laminar axial flow. This is accomplished with frictional losses. As the water spins, it encounters the solid surface of the exterior of the barrel 18, and the walls 34 of the diffusion chamber, which slows down the radial component of the liquid velocity. The change of direction from the outlet 32 of the hydrocyclone 10 to the diffusion chamber 34 creates additional friction, thus removing even more of the radial energy component. The diffusion chamber 34 has a greater diameter than the barrel 18 of the hydrocyclone 10 so as to diffuse the movement of the liquid 12.

With continuing reference to FIG. 7, the diffusion chamber 34 is disposed within a pressure chamber 36. The pressure chamber 36 includes an upper gas region 38 and a lower liquid region 40. As illustrated, the diffusion chamber 34 is disposed within the liquid region 40 such that the exiting liquid 12/gas 30 is directed towards the gas 38/liquid 40 boundary so that large bubbles of undissolved preferential gas 42 coalesce and rise into the gas region 38, whereas the dissolved and micro-size gas bubbles 44 are retained in the liquid and flow into the liquid region 40. The pressure chamber 36 contains the gas 30 and liquid 12 under system pressure and converts the direction of the liquid 12 one more time, effectively dampening any left over radial momentum in the liquid 12. The radial flow is now converted entirely into laminar axial flow.

The laminar flow enables large preferential gas bubbles 42 that get trapped in the liquid 12 to flow back up into the gas collection chamber region 38 so that the gas 30 can be reused. This is accomplished by having a gas recycle pipe 46 extending from the pressure chamber 36 to the hydrocyclone 10 so that gas is not unnecessarily wasted, but can be dissolved into the liquid 12 and recycled. Using the natural vacuum that is formed in the hydrocyclone 10, gas 30 is pulled from the gas collection chamber region 38 of the pressure chamber 36 and delivered back into the hydrocyclone evacuated area 28. Thus, excess gas 30 is continually recycled back through the gas ingestion mechanism. Very little fresh gas 30 is needed to keep the system 22 working at its peak efficiency.

The gas 30 within the gas region 38 is preferably kept at a certain level or pressure, P2. However, it will be appreciated that the recycling of the gas through tube 46 will cause the gas level in the gas region 38 to be depleted over time. Thus, a sensor 48 is utilized to maintain the desired level within the pressure chamber 36, and thus the levels of the gas within the gas region 38, and the liquid within the liquid region 40. As the gas 30 is depleted, the sensor detects the low level of gas in the gas region 38, or the high level of liquid 12 in the liquid region 40, and electronic controls 48 thereof cause pressurized gas 30 from a gas source such as a pressurized gas tank 52 to be released or otherwise pumped into the pressure chamber 36 to equalize the pressure and maintain the proper gas level in the tank.

Thus, as the liquid 12 passes into the hydrocyclone 10 and accelerates down the barrel 18, the rapidly moving liquid 12 interacts with the gas column 30 that exists in the center of the barrel 18 and pulls gas down the barrel 18. If the gas is not replaced, a vacuum forms at the top of the hydrocyclone 10, which has been measured at between 2 and 29.5 inches of vacuum (Hg), depending upon the configuration of the hydrocyclone 10. The recycle tube 46 allows undissolved gas to be recycled, and newly entered gas 30 to be introduced in the evacuated space so that the proper ingestion is maintained. Thus, large excess gas and bubbles are continually recycled back through the gas ingestion mechanism so that only gases that are dissolved and gases that are so small so as to be nearly dissolved, are entrained in the liquid 12 and exit through the system.

Figure 8:
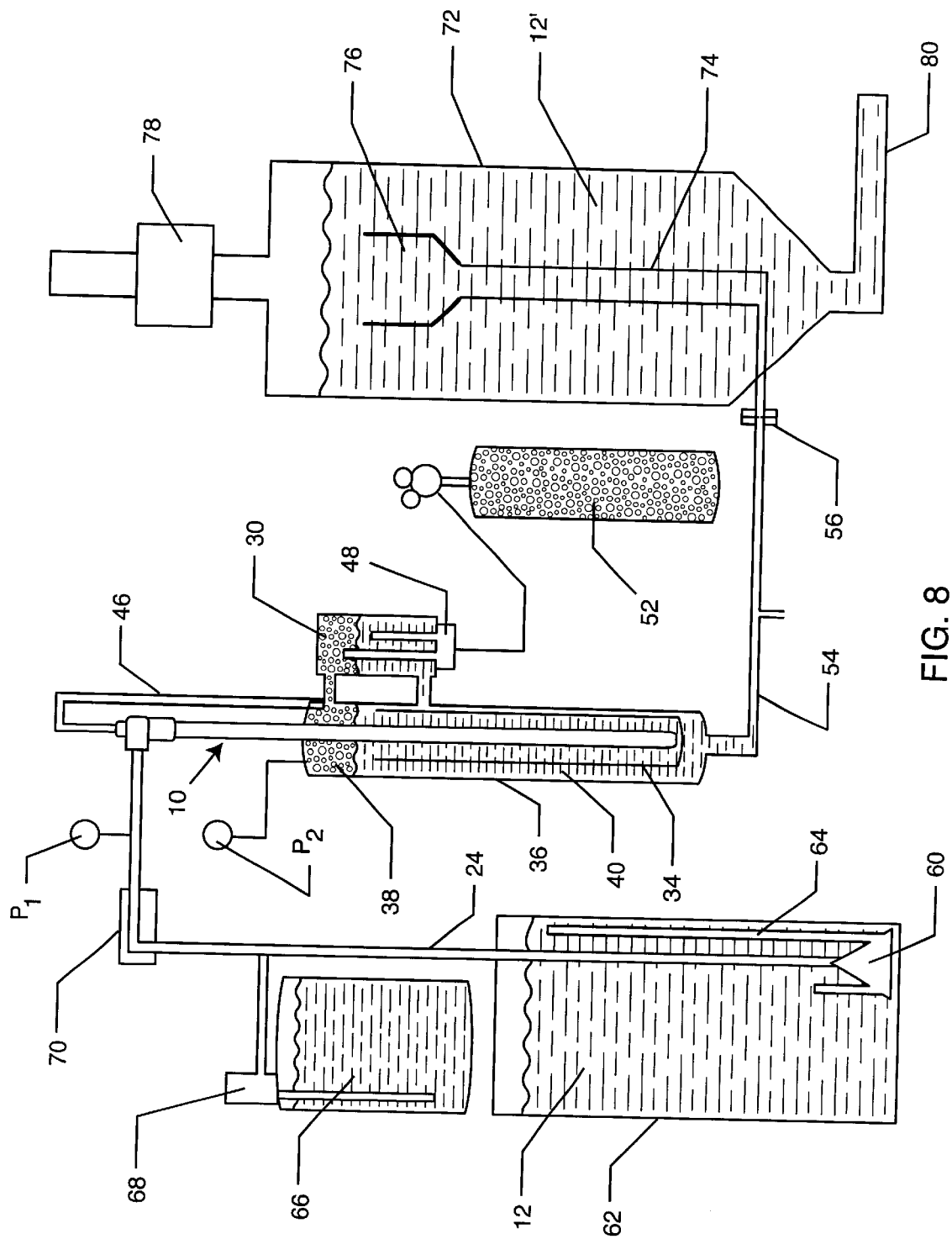
FIG. 8 is a diagrammatic view of a system for dissolving gas into a liquid coupled to systems for removing dissolved gases from the liquid, and using an enlarged up tube in a discharge tank in accordance with the present invention.
Figure 9:
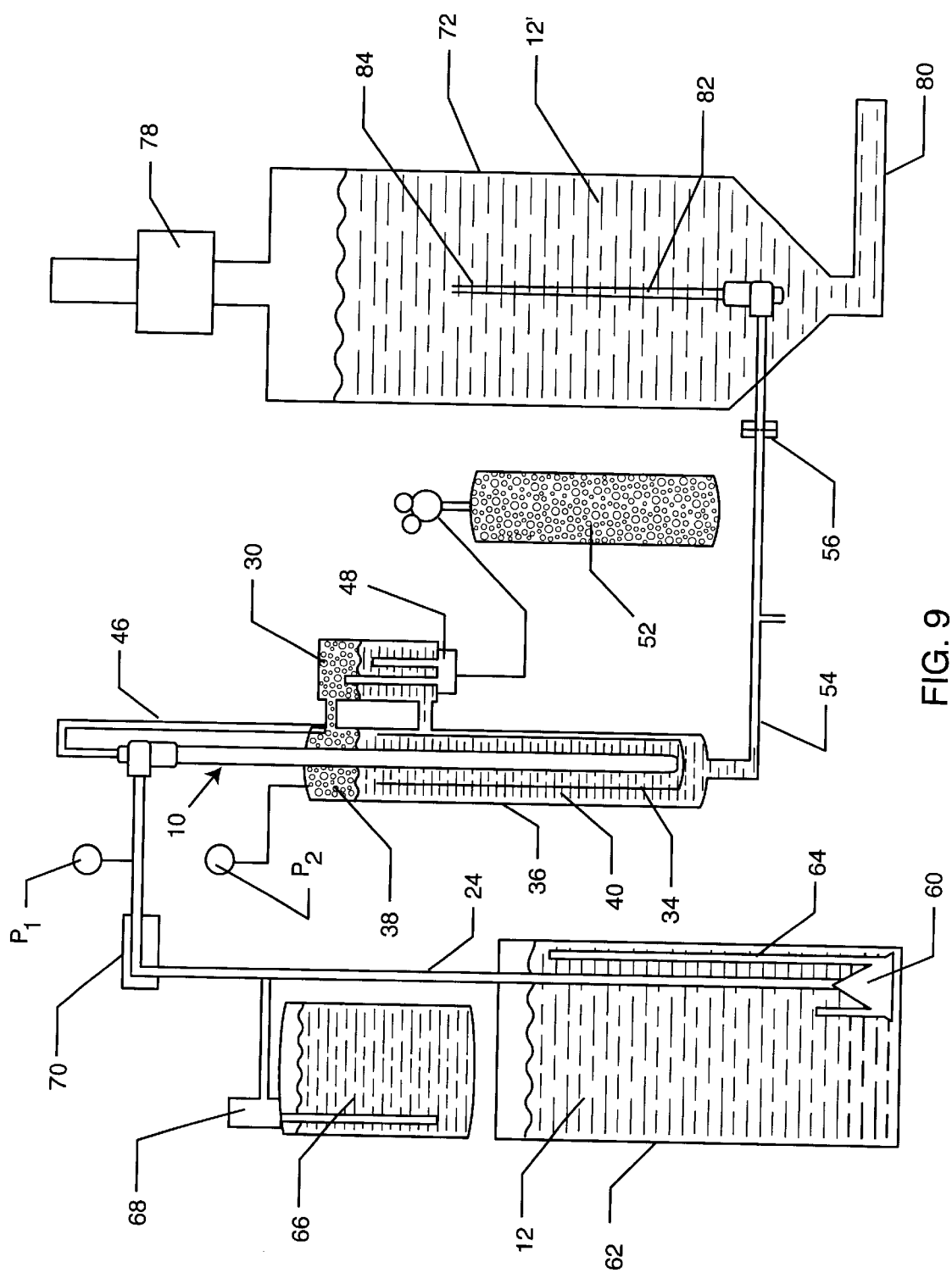
FIG. 9 is a diagrammatic view of a system similar to FIG. 8, illustrating the use of an inverted vacuum cyclone device in a discharge tank thereof.
Figure 10:
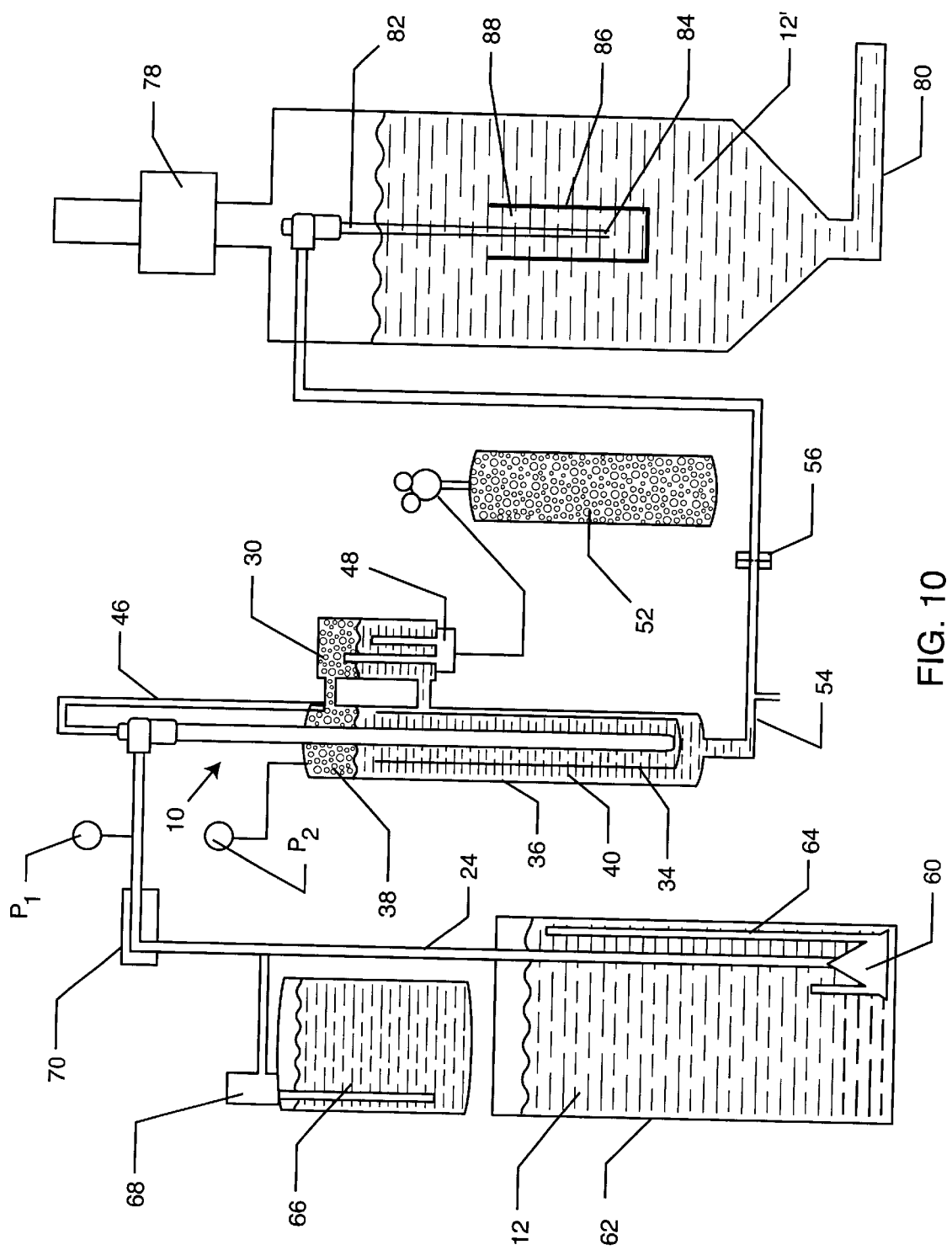
FIG. 10 is a diagrammatic view of a system similar to FIGS. 8 and 9, but having a vacuum cyclone device directed into a deflector in the discharge tank in order to remove dissolved gas in the liquid.

With reference now to FIGS. 8–10, the liquid 12 to be treated may be held within a storage tank 62 or the like at predetermined levels to be pumped using pump 60 into the system 22. The tank 62 may include a sensor 64 in order to maintain sufficient quantities of the liquid 12 to meet the hydraulic requirements of the system 22.

In order to facilitate removal of the undesirable dissolved gas which is already entrained in the liquid 12, or to remove other contaminants from the liquid 12, a treatment additive 66 in the form of powdered clay, acid, cationic solution and ionic solution, etc. may be pumped using pump 68 into the liquid stream flowing through the inlet pipe 24. A mixing apparatus 70 may be positioned ahead of the hydrocyclone 10 in order to mix the treatment additive 66 with the liquid 12.

Once the liquid 12 has been entrained with as much desirable gas 30 as possible using the process of the present invention, the liquid 12' is then released through a pressure chamber outlet 54 and typically through a cavitation plate 56 which effectively pressurizes the system 22 so that the gas 30 can be entrained in the liquid 12 at the appropriate levels. Once the liquid 12' has passed through this plate 56, all pressure on the liquid 12' is released. When the pressure drops, the dissolved gases (both preferential and undesirable) begin to swell and no longer can be held in suspension. The bubbles that form with this method are very fine and are spaced at uniform intervals throughout the liquid 12' at high pressures. However, at lower pressures, the bubbles form and float. The liquid 12' is directed into a discharge or degassing tank 72 which is at ambient pressure.

With particular reference to FIG. 8, the outlet piping 54 is connected to an up tube or outlet pipe 74 having an increasing diameter as it extends upwardly into the discharge tank 72. The outlet tube 74 has an opening 76 disposed fairly close to the top of the liquid 12' level within the discharge tank 72. This enables the large bubbles of gas, both preferential and undesirable, to quickly float to the top of the tank 72.

The off-gassing or discharge tank 72 is used to allow the bubbles to exit the liquid 12' before the next process. The size of the tank that is used depends on a number of variables. The size of the escaping bubbles determines the buoyancy of the bubble. Larger bubbles rise faster than smaller bubbles. An over abundance of very small bubbles will slow down the ability of the undesirable gas to escape from the liquid 12' which would necessitate the use of a larger discharge tank 72 for the process. Another by product of over formation of fine bubbles is the interference caused by placing too many bubbles in a given quantity of liquid 12. Bubbles act as current dampeners. In over abundance they break up flow patterns in the tank 72 which are beneficial to the off gassing process, creating a seething mass of liquid and air each traveling in conflicting directional vectors. Using higher than necessary pressure conversion also prolongs the time necessary for the entrained gases to release. The formation of bubbles continues beyond the normal residence time of the liquid 12' in the off gassing tank 72.

Depending upon the liquid stream characteristics and gas solubility, the discharge tank 72 will be provided for the adequate dispersal of the excess trapped gases in the liquid 12'. This tank 72 will be open in most cases where the gases are not harmful or nuisance-causing to people that come in close proximity to the tank 72. However, in the cases of volatile organic compound strippings and the like, the tank 72 will require a hood, a fan, a carbon air filter, or other air scrubber 78 to filter and capture pernicious substances that could cause dangerous concentrations of flammables or health hazards.

It will be appreciated by those skilled in the art that the amount of undesirable gas which is de-gassed from the liquid 12 will be in direct proportion to the amount of desirable gas 30 which is introduced into the liquid 12. For example, if the liquid 12 was originally saturated with approximately 20% undesirable gas, and when passed through the system 22, 80% preferred gas is introduced, the amount of dissolved gas which bubbles or otherwise exits the liquid 12' at ambient pressure within the discharge tank 72 will be proportional. That is, 80% of the discharged gas will be the preferred gas, while 20% will be the undesired gas. Thus, after passing through the system of the present invention once, 20% of the original amount of undesirable gas will have been removed. Another example is that water typically can hold 11 ppm of oxygen at atmospheric pressure. Pumping in 70 ppm of argon then results in a proportional or fractionated amount of oxygen removal during the de-gassing process.

The liquid 12' is then directed from the discharge tank 72 through an outlet tube 80 to another process or part of the system if the levels of undesirable gas are within tolerances, or recirculated through the system so that the undesirable gas can be fractionated and reduced in quantity yet again until the levels of undesirable gases within the liquid 12 are reduced to a tolerable limit.

With reference now to FIG. 9, instead of utilizing the ever-increasing diameter outlet tube 74, a liquid hydrocyclone running in vacuum mode, referred to herein as a vacuum cyclone device 82 can be connected to the outlet pipe 54 after the cavitation plate 56. Such a vacuum cyclone device 82 drops pressure even further than ambient and draws out additional gases contained in the liquid 12'. This is due to the fact that the hydrocyclone device 82 is closed to the atmosphere, thus creating an evacuating, negative-pressure central portion which causes the gases within the liquid vortex stream therein to leave the liquid in an attempt to balance pressures within the device 82. Preferably, the outlet 84 of the vacuum cyclone device 82 is directed upwardly so that the coalescing of gas bubbles will be ejected towards the liquid surface and the discharge tank 72. This will facilitate the removal of as much dissolved gas within the liquid 12' as possible.

With reference now to FIG. 10, a similar arrangement is illustrated, having a vacuum cyclone device 82, but having the outlet 84 thereof directed into a flow reflector member 86. The flow reflector 86 is similar in operation to the column diffusion chamber 34. That is, as the liquid and gas 12' exits the vacuum cyclone device 82, the radial energy is converted to laminar flow due to the change in direction of the gas and liquid 12' and the frictional forces encountered by the walls of the flow reflector 86. The opening 88 of the flow reflector 86 is directed upwardly, once again, to the liquid level within the discharge tank 72 so that the gas bubbles may exit the liquid 12' as quickly as possible to reduce the level of gases within the liquid 12' to the greatest extent possible. The off-gassing and size of the bubbles in the discharge tank 72 is to a large degree due to the pressure and velocity variables of the system 22, as described above.

The vacuum cyclone devices 82, referred to above, are configured such so as to create a vacuum within the device 82. This is done by closing the hydrocyclone device 82 to the atmosphere. Additionally, the hydrocyclone device 82 is tapered over its length in order to create a vacuum vortex operation. Such a vacuum has been measured in such configurations between 28.5–29 in/hg. A source of electromagnetic energy, such as a photon generator, can be disposed at a top head portion, or even extend into the evacuated portion of the device 82 in order to deliver photons and electromagnetic energy into the liquid $12^1$ as it passes through the device 82. The lightwaves, photons, electromagnetic energy or the like is able to be optimally exposed to the liquid $12^1$ due the vacuum created in the evacuated portion of the cyclone device 82. This is due to the fact that there are no gases or other substances within the evacuated portion, due to the creation of the evacuated/vacuum central portion. Thus, the liquid $12^1$ is irradiated to the greatest extent possible. The liquid surface within the device 82 is not a plane reflective surface, but rather it includes many angularitys, resulting in increased penetration of the electromagnetic energy or photons into the liquid $12^1$ and a greater distribution of such energy along the surface area of the liquid/vacuum interface in a desirable manner. The directing of photons or other electromagnetic energy into the liquid can be used advantageously. For example, if ozone ($O_3$) is entrained within the liquid $12^1$, the photons may be used to treat the liquid $12^1$ and cause the ozone to convert to oxygen or oxygen radicals. The emission of ozone is highly restricted by the government, and can have harmful environmental and health effects. However, oxygen and oxygen radicals do not pose such problems. Additionally, oxygen radicals can be utilized to advantageously alter other substances in the liquid.

The selection of the physical parameters of the hydrocyclone 10, as well as the utilization of the diffusion chamber 34, pressure chamber 36 and accompanying pressures, as well as the recycling of the gas 30 creates a very economic and efficient system which is capable of entraining a higher level of gas 30 into a liquid 12 than conventional devices and methods, thus enabling the increased removal of undesirable gasses.

Although several embodiments have been described in detail for purposes of illustration, various modifications may be made without departing from the scope and spirit of the invention. Accordingly, the invention is not to be limited, except as by the appended claims.

What is claimed is:

1. A process for removing an undesirable dissolved gas from a liquid, comprising the steps of:
    pressurizing the liquid containing the undesirable dissolved gas therein;
    directing the liquid into a hydrocyclone to form a liquid vortex stream having an evacuated central area;
    injecting a preferred gas into the evacuated central area for absorption into the liquid vortex stream; and
    directing the liquid to a discharge tank for removing at least a portion of the dissolved undesirable and preferred gases from the liquid.

2. The process of claim 1, including the step of selecting a hydrocyclone having an inlet aperture size and configuration corresponding with the liquid pressure to optimize liquid particle movement through liquid vortex stream.

3. The process of claim 1, including the step of selecting a hydrocyclone barrel diameter and length optimized for liquid particle movement through the liquid vortex stream.

4. The process of claim 1, including the step of lowering the pressure of the liquid before directing the liquid into the discharge tank to cause a proportional release of the absorbed preferred gas and the undesirable dissolved gas from the liquid.

5. The process of claim 1, including the step of directing the liquid from the hydrocyclone into a diffusion column.

6. The process of claim 5, including the step of directing the liquid from the diffusion column and into a pressure chamber having an upper gas region and a lower liquid region to collect large bubbles and non-dissolved preferred gas from the liquid.

7. The process of claim 6, including the step of directing the preferred gas in the gas region of the pressure chamber back into the evacuated area of the liquid vortex.

8. The process of claim 6, including the step of sensing the level of gas within the pressure chamber.

9. The process of claim 8, including the step of adding pressurized gas into the pressure chamber when the gas level of the pressure chamber falls below a predetermined level.

10. The process of claim 1, including the step of passing the liquid through a cavitation plate before directing the liquid into the discharge tank.

11. The process of claim 1, including the step of directing the liquid through a vacuum cyclone device having an outlet thereof directed towards a liquid surface of the discharge tank.

12. The process of claim 1, including the step of directing the liquid through a vacuum cyclone device having an outlet thereof directed towards a flow reflector disposed within the discharge tank.

13. The process of claim 1, including the step of directing the liquid through an outlet pipe of increasing diameter and having an outlet thereof directed towards a liquid surface of the discharge tank.

14. A process for removing an undesirable dissolved gas from a liquid, comprising the steps of:
    pressurizing the liquid containing the undesirable dissolved gas therein;
    selecting a hydrocyclone having an inlet aperture size and configuration and a barrel diameter and length optimized for liquid particle movement through a liquid vortex stream created by the hydrocyclone;
    directing the liquid into a hydrocyclone to form a liquid vortex stream having an evacuated central area;
    injecting a preferred gas into the evacuated central area for absorption into the liquid vortex stream; and
    lowering the pressure of the liquid to cause a proportional release of the absorbed preferred gas and the undesirable dissolved gas from the liquid and directing the liquid into a discharge tank for collection of the released gases.

15. The process of claim 14, including the step of directing the liquid from the hydrocyclone into a diffusion column and then into a pressure chamber having an upper gas region and a lower liquid region to collect large bubbles and non-dissolved preferred gas from the liquid.

16. The process of claim 15, including the step of directing the preferred gas in the gas region of the pressure chamber back into the evacuated area of the liquid vortex.

17. The process of claim 16, including the step of sensing the level of gas within the pressure chamber and adding pressurized gas into the pressure chamber when the gas level of the pressure chamber falls below a predetermined level.

18. The process of claim 14, including the step of passing the liquid through a cavitation plate before directing the liquid into the discharge tank.

19. The process of claim 14, including the step of directing the liquid through a vacuum cyclone device having an outlet thereof directed towards a liquid surface of the discharge tank.

20. The process of claim 14, including the step of directing the liquid through a vacuum cyclone device having an outlet thereof directed towards a flow reflector disposed within the discharge tank.

21. The process of claim 14, including the step of directing the liquid through an outlet pipe of increasing diameter and having an outlet thereof directed towards a liquid surface of the discharge tank.

22. A process for removing an undesirable dissolved gas from a liquid, comprising the steps of:
    pressurizing the liquid containing the undesirable dissolved gas therein;
    selecting a hydrocyclone having an inlet aperture size and configuration and a barrel diameter and length optimized for liquid particle movement through a liquid vortex stream created by the hydrocyclone;
    directing the liquid into a hydrocyclone to form a liquid vortex stream having an evacuated central area;
    injecting a preferred gas into the evacuated central area for absorption into the liquid vortex stream;
    directing the liquid from the hydrocyclone into a diffusion column and then into a pressure chamber having an upper gas region and a lower liquid region to collect large bubbles and non-dissolved preferred gas from the liquid;

directing the preferred gas in the gas region of the pressure chamber back into the evacuated area of the liquid vortex;

sensing the level of gas within the pressure chamber and adding pressurized gas into the pressure chamber when the gas level of the pressure chamber falls below a predetermined level; and lowering the pressure of the liquid exiting the pressure chamber to cause a proportional release of the absorbed preferred gas and the undesirable dissolved gas from the liquid and directing the liquid into a discharge tank for collection of the released gases.

23. The process of claim 22, including the step of passing the liquid through a cavitation plate before directing the liquid into the discharge tank.

24. The process of claim 22, including the step of directing the liquid through a vacuum cyclone device having an outlet thereof directed towards a liquid surface of the discharge tank.

25. The process of claim 22, including the step of directing the liquid through a vacuum cyclone device having an outlet thereof directed towards a flow reflector disposed within the discharge tank.

26. The process of claim 22, including the step of directing the liquid through an outlet pipe of increasing diameter and having an outlet thereof directed towards a liquid surface of the discharge tank.

* * * * *